(12) United States Patent
Mackinnon et al.

(10) Patent No.: US 7,897,692 B2
(45) Date of Patent: *Mar. 1, 2011

(54) SULFONATED PERFLUOROCYCLOBUTANE BLOCK COPOLYMERS AND PROTON CONDUCTIVE POLYMER MEMBRANES

(75) Inventors: Sean M Mackinnon, West Henrietta, NY (US); Timothy J. Fuller, Pittsford, NY (US); Frank Coms, Fairport, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 279 days.

This patent is subject to a terminal disclaimer.

(21) Appl. No.: 12/197,537

(22) Filed: Aug. 25, 2008

(65) Prior Publication Data

US 2009/0278091 A1     Nov. 12, 2009

Related U.S. Application Data

(60) Provisional application No. 61/052,119, filed on May 9, 2008.

(51) Int. Cl.
*C08F 214/14* (2006.01)

(52) U.S. Cl. .................... 525/326.2; 526/250; 526/252; 526/253; 526/254

(58) Field of Classification Search ............. 525/326.2; 526/250, 252, 253, 254
See application file for complete search history.

(56) References Cited

U.S. PATENT DOCUMENTS

| | | | |
|---|---|---|---|
| 5,021,602 A | 6/1991 | Clement et al. | |
| 5,037,917 A | 8/1991 | Babb et al. | |
| 5,066,746 A | 11/1991 | Clement et al. | |
| 5,159,037 A | 10/1992 | Clement et al. | |
| 5,159,038 A | 10/1992 | Babb et al. | |
| 5,316,871 A | 5/1994 | Swathirajan et al. | |
| 5,910,378 A | 6/1999 | Debe et al. | |
| 6,124,060 A | 9/2000 | Akita et al. | |
| 6,183,668 B1 | 2/2001 | Debe et al. | |
| 6,277,512 B1 | 8/2001 | Hamrock et al. | |
| 6,384,167 B2 | 5/2002 | DesMarteau et al. | |
| 6,444,343 B1 | 9/2002 | Prakash et al. | |
| 6,521,381 B1 | 2/2003 | Vyas et al. | |
| 6,523,699 B1 | 2/2003 | Akita et al. | |
| 6,559,237 B1 | 5/2003 | Mao et al. | |
| 6,670,065 B2 | 12/2003 | Koyama et al. | |
| 6,847,518 B2 | 1/2005 | Fukuda et al. | |
| 6,875,537 B2 | 4/2005 | Tani et al. | |
| 6,926,984 B2 | 8/2005 | Asano et al. | |
| 6,933,068 B2 | 8/2005 | Asano et al. | |
| 6,953,653 B2 * | 10/2005 | Smith et al. ................. 430/321 |
| 6,986,962 B2 | 1/2006 | Oyanagi et al. | |
| 7,001,929 B2 | 2/2006 | Goto et al. | |
| 7,045,241 B2 | 5/2006 | Akita et al. | |
| 7,094,851 B2 | 8/2006 | Wu et al. | |
| 2001/0018144 A1 | 8/2001 | Watakabe et al. | |
| 2002/0014405 A1 | 2/2002 | Arcella et al. | |
| 2003/0017379 A1 | 1/2003 | Menashi | |
| 2003/0096149 A1 | 5/2003 | Koyama et al. | |
| 2003/0180596 A1 | 9/2003 | Yoshimura et al. | |
| 2004/0214058 A1 | 10/2004 | Tada et al. | |
| 2004/0214065 A1 | 10/2004 | Kanaoka et al. | |
| 2005/0014927 A1 | 1/2005 | Akita | |
| 2005/0043487 A1 | 2/2005 | Felix et al. | |
| 2005/0048342 A1 | 3/2005 | Wakahoi et al. | |
| 2005/0053810 A1 | 3/2005 | Kato et al. | |
| 2005/0058864 A1 | 3/2005 | Goebel | |
| 2005/0064260 A1 | 3/2005 | Otsuki et al. | |
| 2005/0100770 A1 | 5/2005 | Sugawara et al. | |
| 2005/0106440 A1 | 5/2005 | Komiya | |
| 2005/0116206 A1 | 6/2005 | Kakuta et al. | |
| 2005/0130024 A1 | 6/2005 | Otsuki et al. | |
| 2005/0142397 A1 | 6/2005 | Wakahoi et al. | |
| 2005/0143530 A1 | 6/2005 | Iwadate et al. | |
| 2005/0175886 A1 | 8/2005 | Fukuda et al. | |
| 2005/0197467 A1 | 9/2005 | Komiya et al. | |
| 2005/0227138 A1 | 10/2005 | Fukuda et al. | |
| 2005/0233181 A1 | 10/2005 | Wariishi et al. | |
| 2005/0260474 A1 | 11/2005 | Asano et al. | |
| 2006/0019147 A1 | 1/2006 | Fukuda et al. | |
| 2006/0127728 A1 | 6/2006 | Otsuki et al. | |

(Continued)

FOREIGN PATENT DOCUMENTS

JP     2003535929 T     12/2003

(Continued)

OTHER PUBLICATIONS

Body, S.M. et al., "Facile preparation of fluorovinylene aryl ether telechelic polymers with dual functionality for thermal chain extension and tandem crossliking," Chem. Commun. 2006, pp. 4844-4846, 2006.

(Continued)

*Primary Examiner*—Bernard Lipman
(74) *Attorney, Agent, or Firm*—Brooks Kushman P.C.

(57) ABSTRACT

A sulfonated aromatic perfluorocyclobutane block copolymer comprises a hydrophobic perfluorocyclobutane ether chain segment and a hydrophilic sulfonated perfluorocyclobutane ether chain segment. The sulfonated perfluorocyclobutane copolymer may be used to make proton conductive membranes and membrane electrode assemblies in fuel cells. Processes of making the block copolymer through thermal coupling reactions are also disclosed.

20 Claims, 9 Drawing Sheets

U.S. PATENT DOCUMENTS

| | | |
|---|---|---|
| 2006/0177719 A1 | 8/2006 | Fuller et al. |
| 2007/0042242 A1 | 2/2007 | Tada et al. |
| 2007/0099054 A1 | 5/2007 | Fuller et al. |
| 2007/0141237 A1 | 6/2007 | Okiyama et al. |
| 2008/0027152 A1 | 1/2008 | Maier et al. |
| 2009/0278083 A1 | 11/2009 | Fuller et al. |

FOREIGN PATENT DOCUMENTS

| | | | |
|---|---|---|---|
| JP | 2005129298 A | | 5/2005 |
| JP | 2005166557 A | | 6/2005 |
| JP | 2005179380 A | | 7/2005 |
| JP | 2009249487 | * | 4/2008 |
| JP | 2009249487 A | | 10/2009 |
| WO | 2004/051776 | | 6/2004 |
| WO | 2007/052954 A1 | | 5/2007 |

OTHER PUBLICATIONS

Li, Z. et al., A Novel Bisphenol Monomer with Grafting Capability and the Resulting Poly(arylene ether sulfone)s, Macromolecules 2006, 39, pp. 6990-6996.

Matsumura, S. et al., Ionomers for Proton Exchange Membrane Fuel Cells with Sulfonic Acid Groups on the End Groups: Novel Branched Poly(eteher-ketone)s, Macromolecules 2008, 41, pp. 281-284.

Smith, D.W. et al., "Perfluorocyclobutane Aromatic Polyethers. Synthesis and Characterization of New Siloxane-Containing Fluoropolymers," Macromolecules 1996, v. 29, pp. 852-860.

Smith, D.W. et al., "Perfluorocyclobutane (PFCB) polyaryl ethers: versatile coatings material," J. of Fluorine Chem., v. 104, pp. 109-117 (2000).

Souzy, R. et al., "Functional fluoropolymers for fuel cell membranes," Solid State Ionics, v. 176, pp. 2839-2848 (2005).

Souzy, R. et al., "Functional fluoropolymers for fuel cell membranes," Prog. Polm. Sci. 30, 2005, pp. 644-687.

Ford, L.A. et al., "New Aromatic Perfluorovinyl Ether Monomers Containing the Sulfonimide Acid Functionality," Polymeric Materials Science & Eng., v. 83, 2000, pp. 10-11 (American Chemical Society).

Souzy, R. et al., "Synthesis and (co)polymerization of monofluoro, difluoro, trifluorostyrene and ((trifluorovinyl)oxy) benzene," Prog. Polm. Sci. 29 (2004), pp. 75-106.

* cited by examiner

SULFONATED PERFLUOROCYCLOBUTANE BLOCK COPOLYMERS AND PROTON CONDUCTIVE POLYMER MEMBRANES

CROSS-REFERENCE TO RELATED APPLICATIONS

This application claims the benefit of U.S. provisional application Ser. No. 61/052,119 filed May 9, 2008.

BACKGROUND OF THE INVENTION

1. Field of the Invention

The present invention relates to ion conductive polymers, fuel cell membranes and membrane electrode assemblies.

2. Background Art

Proton conductive polymer membranes are an important component in a fuel cell device. To achieve optimal fuel cell performance, the proton conductive polymer membrane must maintain a high ionic conductivity and mechanical stability when cycled between high and low relative humidity. Aromatic perfluorocyclobutane random copolymers have been disclosed in U.S. Pat. No. 6,559,237 as membrane materials for fuel cells. Due to the chain configuration of random copolymers, however, water swelling at high humidity and membrane shrinking at low humidity are common problems with random copolymers. A random copolymer membrane lacks the mechanical robustness to withstand the rigors of hydration and dehydration within an operating fuel cell.

Accordingly, there is a need to provide a further improved proton conductive polymer membrane that maintains robust mechanical properties and high ionic conductivity at wide range of humidity conditions.

SUMMARY OF THE INVENTION

The present invention solves one or more problems of the prior art by providing in at least one embodiment a polymer that is useful as an ion conductor for fuel cell applications. The polymer of this embodiment comprises polymer segments 1 and 2:

$$[E_1(Z_1)_d]\text{—}P_1\text{-}Q_1\text{-}P_2 \qquad 1$$

$$E_2\text{-}P_3\text{-}Q_2\text{-}P_4 \qquad 2$$

wherein:

$Z_1$ is a protogenic group such as 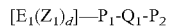—SO$_2$X, —PO$_3$H$_2$, —COX, and the like;

$E_1$ is an aromatic containing moiety;

$E_2$ is an unsulfonated aromatic-containing and/or aliphatic-containing moiety;

X is an —OH, a halogen, an ester, or

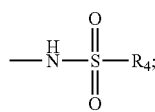

d is the number of $Z_1$ attached to $E_1$;

$P_1$, $P_2$, $P_3$, $P_4$ are each independently: absent, —O—, —S—, —SO—, —CO—, —SO$_2$—, —NH—, NR$_2$—, or —R$_3$—, and $R_2$ is $C_{1-25}$ alkyl, $C_{1-25}$ aryl or $C_{1-25}$ arylene;

$R_3$ is $C_{1-25}$ alkylene, $C_{1-25}$ perfluoroalkylene, perfluoroalkyl ether, alkylether, or $C_{1-25}$ arylene;

$R_4$ is trifluoromethyl, $C_{1-25}$ alkyl, $C_{1-25}$ perfluoroalkylene, $C_{1-25}$ aryl, or another $E_1$ group; and $Q_1$, $Q_2$ are each independently a fluorinated cyclobutyl moiety.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawings, wherein.

DETAILED DESCRIPTION OF THE PREFERRED EMBODIMENT(S)

Figure 1:
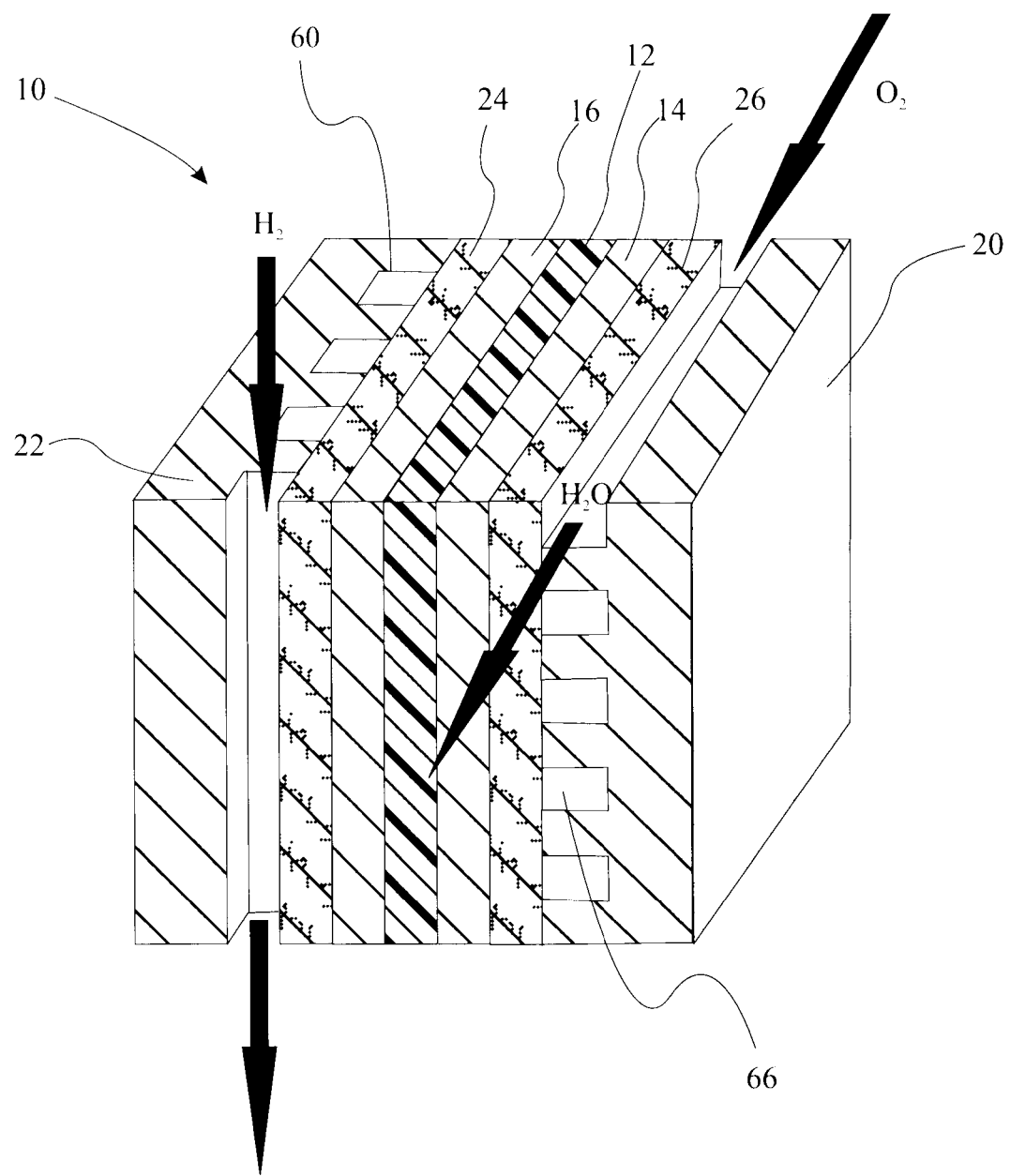
FIG. 1 provides a schematic illustration of a fuel cell incorporating the polymers of an embodiment of the present invention.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," "block," "random," "segmented block," and the like; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies *mutatis mutandis* to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

The following description of the embodiment(s) is merely exemplary in nature and is in no way intended to limit the invention, its application, or uses.

The term "block" as used herein means a portion of a macromolecule, comprising many constitutional units, that has at least one feature that is not present in adjacent portions.

The term "block macromolecule" as used herein means a macromolecule that is composed of blocks in linear sequence.

The term "block polymer" as used herein means a substance composed of block macromolecules.

The term "block copolymer" as used herein means a polymer in which adjacent blocks are constitutionally different, i.e., each of these blocks comprise constitutional units derived from different characteristic species of monomer or with different composition or sequence distribution of constitutional units.

The term "random copolymer" as used herein means a copolymer consisting of macromolecules in which the probability of finding a given repeating unit at any given site in the chain is independent of the nature of the adjacent units.

With reference to FIG. 1, a fuel cell that incorporates a polymer electrolyte including polymers from the invention is provided. PEM fuel cell 10 includes polymeric ion conductive membrane 12 disposed between cathode catalyst layer 14 and anode catalyst layer 16. Polymeric ion conductive membrane 12 includes one or more of the polymers set forth below. Fuel cell 10 also includes conductive plates 20, 22, gas channels 60 and 66, and gas diffusion layers 24 and 24.

In an embodiment of the present invention, a polymer comprising polymer segments 1 and 2 is provided:

[E₁(Z₁)_d]—P₁-Q₁-P₂    1

E₂-P₃-Q₂-P₄    2 wherein:

$Z_1$ is a protogenic group such as —SO₂X, —PO₃H₂, —COX, and the like;

$E_1$ is an aromatic containing moiety;

$E_2$ is an unsulfonated aromatic-containing and/or aliphatic-containing moiety;

X is an —OH, a halogen, an ester, or

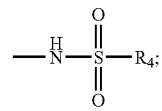

d is the number of $Z_1$ attached to $E_1$. In one refinement, d is equal to the number of aromatic rings in $E_1$. In another refinement, each aromatic ring in $E_1$ can have 0, 1, 2, 3, or 4 $Z_1$ groups;

$P_1$, $P_2$, $P_3$, $P_4$ are each independently: absent, —O—, —S—, —SO—, —CO—, —SO₂—, —NH—, NR₂—, or —R₃—, and $R_2$ is $C_{1-25}$ alkyl, $C_{1-25}$ aryl or $C_{1-25}$ arylene;

$R_3$ is $C_{1-25}$ alkylene, $C_{1-25}$ perfluoroalkylene, perfluoroalkyl ether, alkylether, or $C_{1-25}$ arylene;

$R_4$ is trifluoromethyl, $C_{1-25}$ alkyl, $C_{1-25}$ perfluoroalkylene, $C_{1-25}$ aryl, or another $E_1$ group; and $Q_1$, $Q_2$ are each independently a fluorinated cyclobutyl moiety. In a refinement of the present embodiment, the total number of segments having formula 1 in a polymer sample is equal to or greater than half the total number of segments having formula 2 in that polymer sample. In a variation of the present embodiment, the total number of segments having formula 1 in a polymer sample is equal to or greater than the total number of segments having formula 2. In one refinement the total number of segments having formula 1 plus the total number of segments having formula 2 is less than 500 with the total number of segments having formula 1 being greater than the total number of segments having formula 2.

In a variation of the present embodiment, polymer segment 1 is repeated i times to form polymer unit 3:

-([E₁(SO₂X)_d]—P₁-Q₁-P₂)_i—    [3]; and polymer segment 2 is repeated j times for form polymer unit 4

-(E₂-P₃-Q₂-P₂)_j—    [4].

In a refinement of this variation, i and j are each independently from 1 to 500. In another refinement of this variation, i and j are each independently from 1 to 200. In still another refinement of this variation, i and j are each independently from 1 to 35. In yet another refinement of this variation, i and j are each independently from 5 to 60. In yet another refinement of this variation, i and j are each independently from 5 to 35.

In another variation of the present embodiment, $E_1$ and $E_2$ include one or more aromatic rings. For example, $E_1$ and $E_2$, include one or more of phenyl (formula 6), biphenyl (formula 7), triphenyl, (formula 8), terphenyl, naphthalenyl (formula 9), phenanthrenyl (formula 10), diphenyl ether (formula 11), 9,9'-diphenylfluorene (formula 12), diphenylsulfide (formula 13), diphenylcyclohexyl methane (formula 14), diphenyidimethylsilane (formula 15), α-methylstilbene (formula 16), hydroquinone diphenyl ether (formula 17), 2,2'-diphenylisopropylidene. In a perfluorocyclobutane block copolymer, $E_1$ is typically different from $E_2$. In one further refinement, $E_1$ is a sulfonatable aromatic moiety while $E_2$ is not.

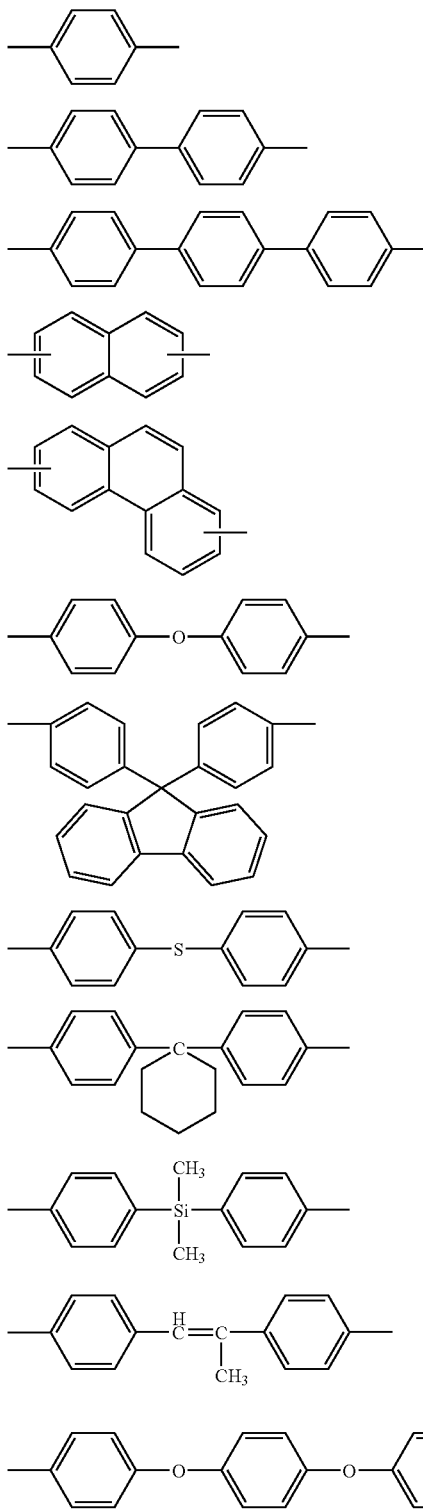

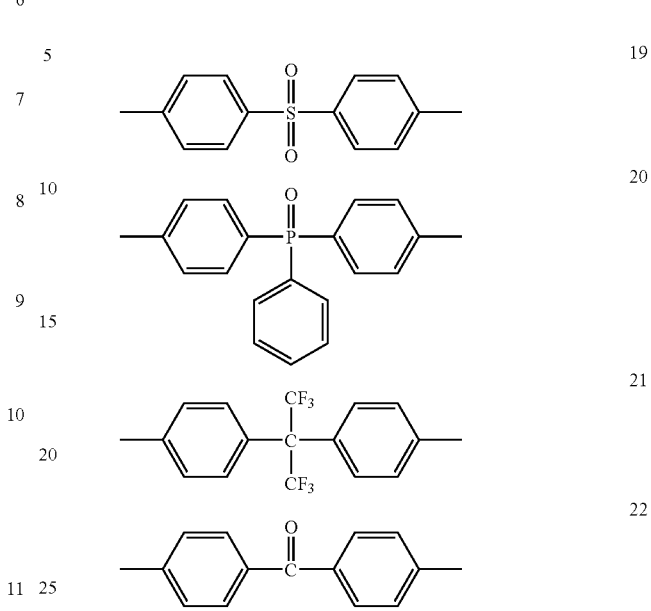

Sulfonated moiety $E_1$ may contain at least one sulfonate or sulfonic acid group. In other words, d may be an integer of 1 or greater. For example, $E_1$ may be a sulfonated biphenyl moiety having one, two, three, or four sulfonic acid groups attached to the biphenyl moiety.

There are numerous ways of making the perfluorocyclobutane block copolymers. In one embodiment, two different oligomers (one containing moiety $E_2$ and the other containing moiety $E_1$), each having at least one reactive end group per molecule, are prepared separately by step growth thermal cycloaddition reaction of the corresponding trifluorovinyl ether monomers represented by the formula, $CF_2=CF-O-E_2-O-CF=CF_2$ and $CF_2=CF-O-E_1-O-CF=CF_2$. Trifluorovinyl ether monomers are readily polymerized by a thermal—bi-radical mediated—step growth mechanism, resulting in well-defined perfluorocyclobutane oligomers and polymers containing trifluorovinyl end groups. The end group(s) of each oligomer may be further modified to allow coupling reaction(s) with other oligomers and polymers. The two oligomers are allowed to react with each other by copolymerization reactions or other coupling reactions to form a block copolymer. The block copolymer may be sulfonated by reacting with a halosulfonic acid, sulfuric acid, fuming sulfuric acid, acetyl sulfate, dimethylformamide-$SO_3$ complex, or chlorotrimethlysulfonyl chloride. Chlorosulfonic acid is a selective sulfonating agent and preferentially forms $Cl-SO_2-$ and $HO-SO_2-$ groups on $E_1$ aromatic groups. Oleum is a more non-selective sulfonating agent and forms $HO-SO_2-$ groups on $E_1$ preferentially but may also sulfonate $E_2$ aromatic groups. The other sulfonating agents listed are much less effective sulfonating agents than either oleum and $ClSO_3H$, even towards the more activated $E_1$ aromatic groups. In a block copolymer, moiety $E_2$ and moiety $E_1$ may be chosen in such a way that moiety $E_1$ has significantly higher reactivity with a sulfonation agent than moiety $E_2$. The moiety $E_1$ in the copolymer can thus be selectively sulfonated, resulting in a block copolymer having a hydrophobic perfluorocyclobutane ether chain segment and a hydrophilic sulfonated perfluorocyclobutane ether chain segment.

In refinement of the present embodiment, the combination of $E_1$ and $E_2$ are chosen such that $E_1$ can be more selectively sulfonated without affecting $E_2$ in an oligomer or a polymer comprising both $E_1$ and $E_2$. Examples of $E_2$ useful in this refinement include, but not limited to, one or more of the following functional groups: diphenyl sulfone (formula 19), triphenylphosphonyl (formula 20), 2,2'-diphenyl hexafluoropropane (formula 21), and diphenylketone (formula 22).

A trifunctional trifluorovinyl ether monomer may be included in the preparing of the oligomers or block copolymers to crosslink the polymer chains. Non-limiting examples of trifunctional trifluorovinyl ether may include 1,1,1-tris(4-trifluorovinyloxyphenyl) ethane (formula 23), 1,1,1-tris(4-trifluorovinyloxylphenyl)-2,2,2-trifluoroethane (formula 24), tris(trifluorovinyloxyphenyl)phosphate (formula 25), and 1,3,5-tris(trifluorovinyloxyphenyl)benzene (formula 26).

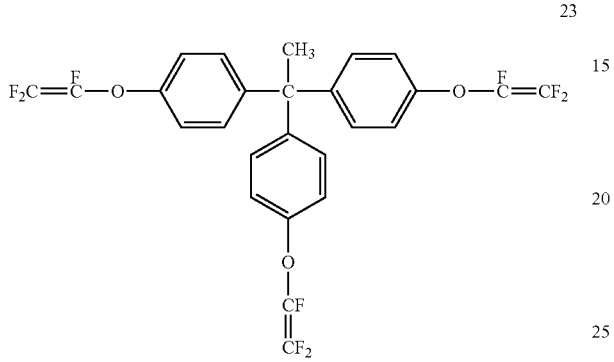

23

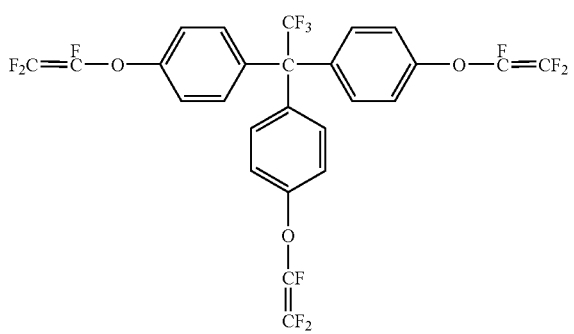

24

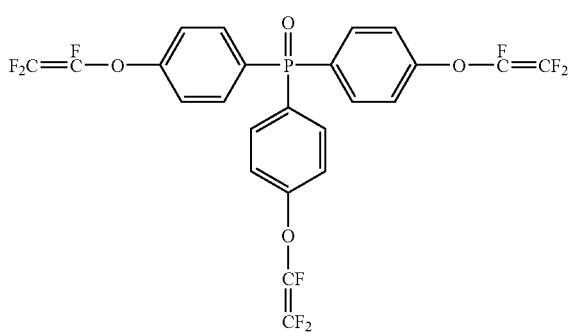

25

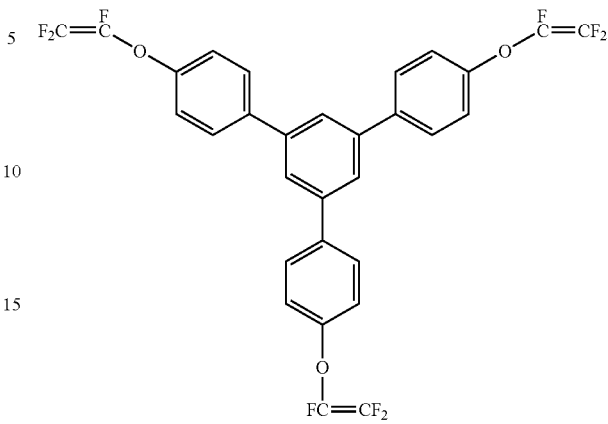

26

The term, oligomer is herein referred to as a molecule with finite number of repeating monomer units and at least one reactive end group. The monomer units in an oligomer typically include a perfluorocyclobutane moiety and a moiety D or E connected through an ether linkage "—O—". A reactive end group typically includes a trifluorovinyloxy group or any other reactive groups that allow two oligomers to react and join together through the formation of chemical bond(s).

Figure 2:
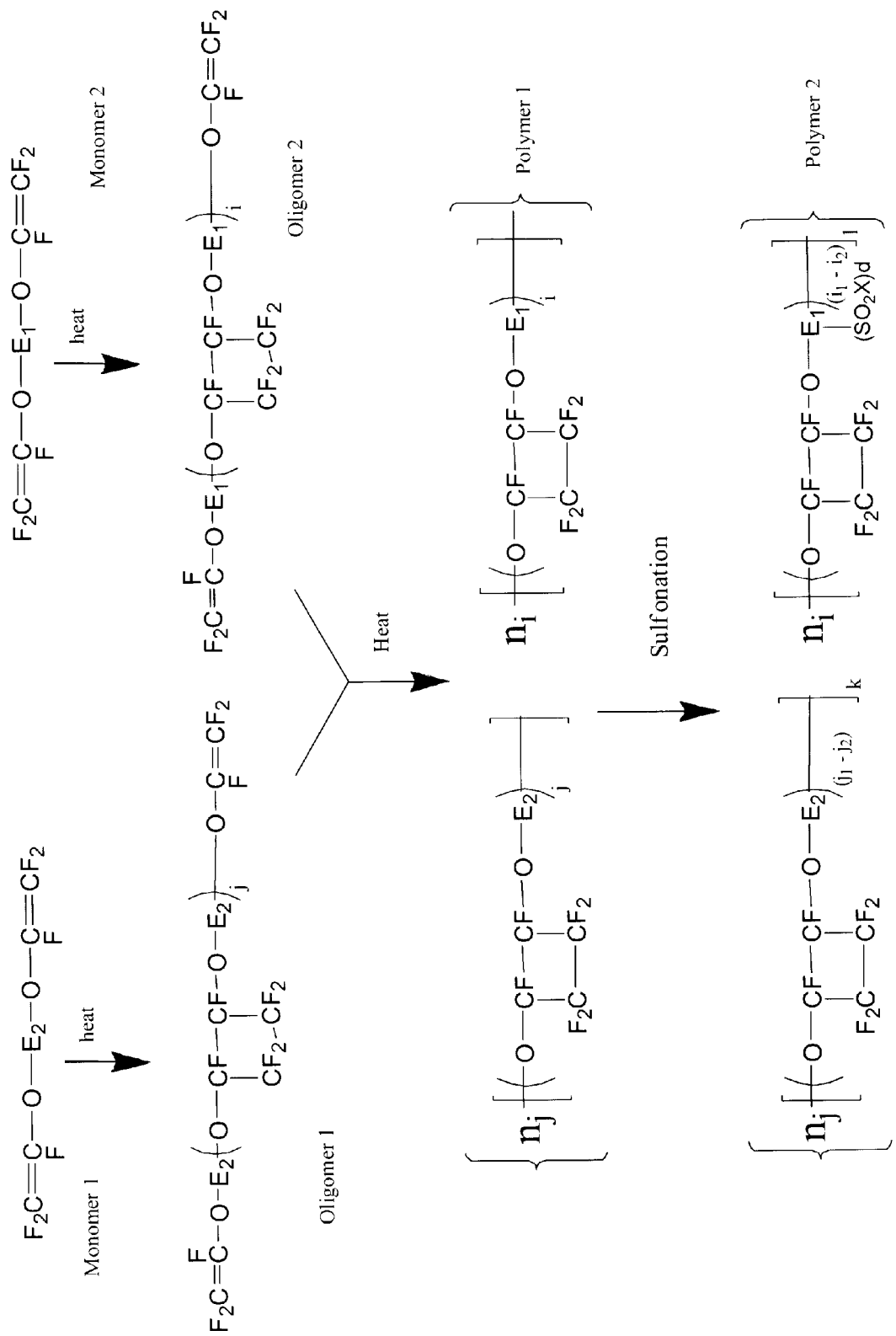
FIG. 2 shows one embodiment of a synthetic route of preparing a sulfonated perfluorocyclobutane block copolymer with linear polymer chain configuration.
Figure 3:
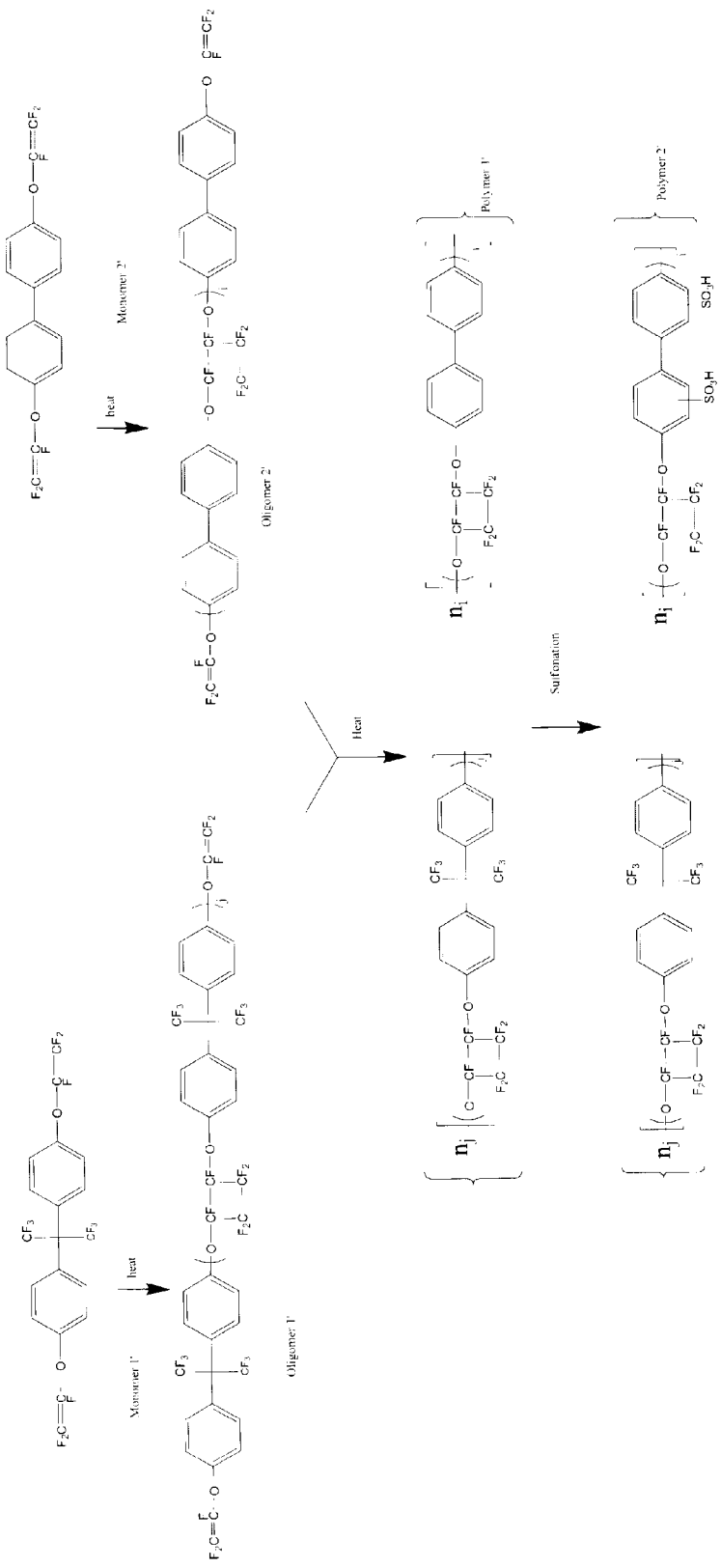
FIG. 3 shows a specific example of the synthetic scheme of FIG. 2.

In one embodiment, FIG. 2 describes a synthetic route of preparing a perfluorocyclobutane block copolymer. In this embodiment, a bis(trifluorovinyl) ether monomer having a moiety D (monomer 1) and a bis(trifluorovinyl) ether monomer having a moiety E (monomer 2) are reacted separately through a thermal cycloaddition coupling reaction to form two oligomers (oligomer 1 and oligomer 2). Each of the oligomers has two trifluorovinyl ether end groups, and is thus a difunctional oligomer. Moiety D and moiety E are described previously. The two difunctional oligomers are combined and reacted together through thermal coupling reaction between their end groups to form a block copolymer (polymer 1). Polymer 1 is further reacted with a sulfonation agent $XSO_3H$ (X is chlorine or fluorine atom) to selectively sulfonate moiety $E_1$, resulting in a perfluorocyclobutane block copolymer (polymer 2) having a hydrophobic chain segment and a hydrophilic sulfonated chain segment. $XSO_3H$ represents a halosulfonic acid such as chlorosulfonic acid and fluorosulfonic acid. Formation of random copolymers are avoided in this manner by first preparing oligomers from one or both monomers separately before combining with the other corresponding monomer or oligomer to form the block copolymer. Thermal coupling reactions, also called the cycloaddition reaction, of trifluorovinyl ethers for preparing oligomers and polymers are described in U.S. Pat. No. 6,384,167 B2 and U.S. Pat. No. 6,559,237 B1. FIG. 3 provides a specific example of the synthetic scheme of FIG. 2.

Figure 4:
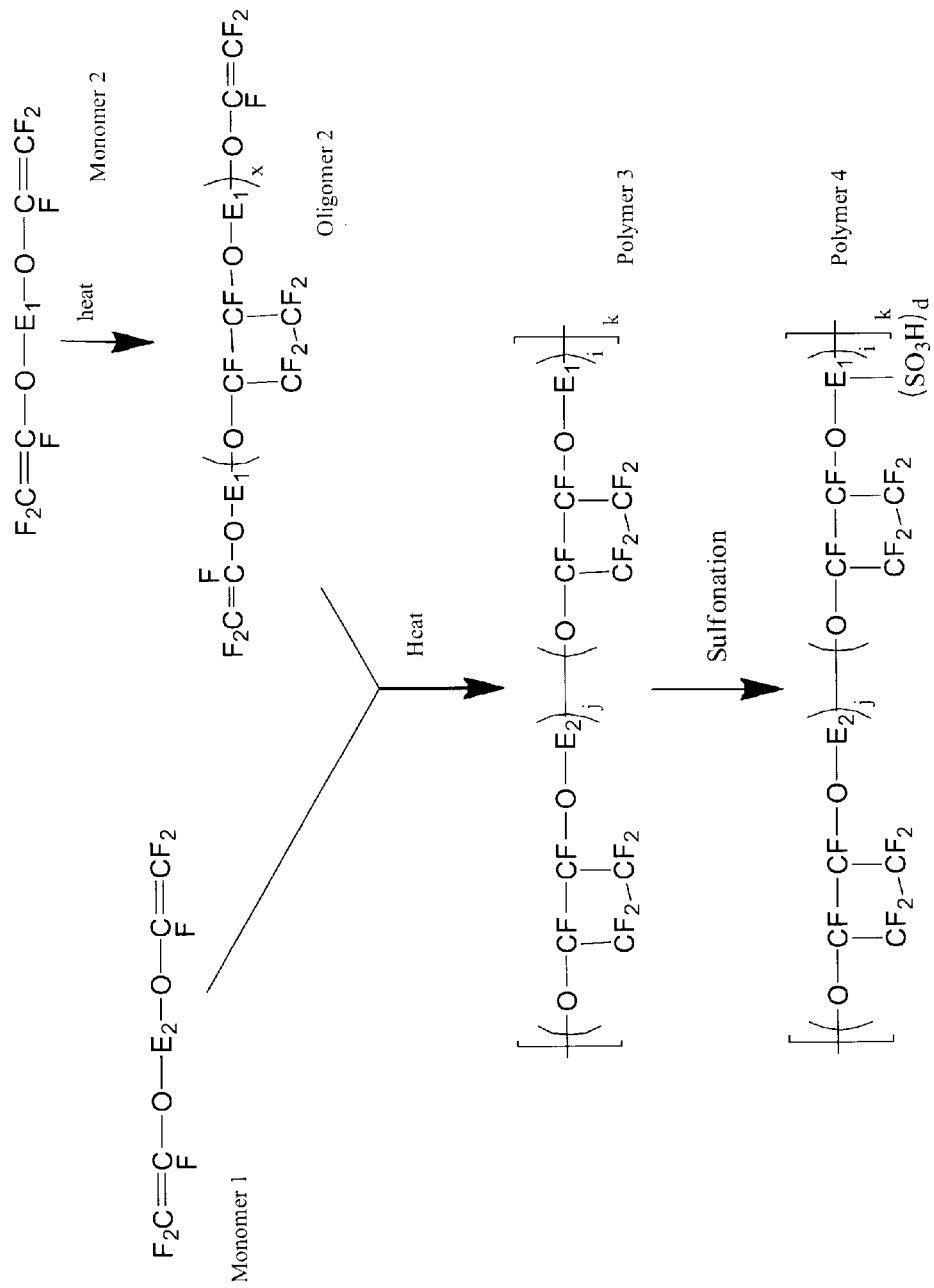
FIG. 4 shows another embodiment of a synthetic route of preparing a sulfonated perfluorocyclobutane block copolymer with linear polymer chain configuration.
Figure 5:
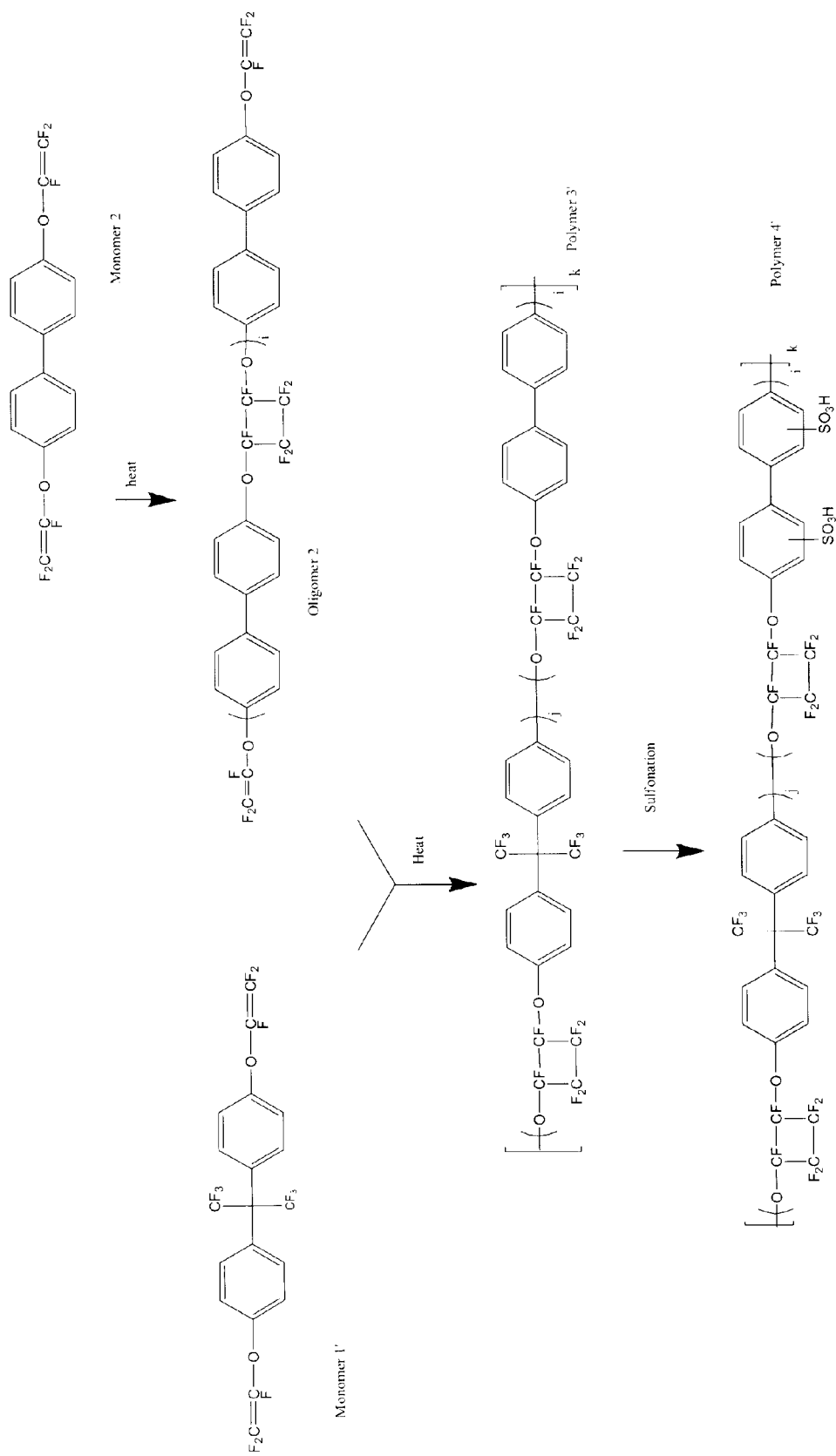
FIG. 5 shows a specific example of the synthetic scheme of FIG. 4.

In another embodiment, as shown in FIG. 4 oligomer 2 is formed from monomer 2 as set forth above. Monomer 1 is then reacted with oligomer 2 to form polymer 3. Polymer 3 is further reacted with a sulfonation agent $XSO_3H$ (X is chlorine or fluorine atom) to selectively sulfonate moiety $E_1$, resulting in a perfluorocyclobutane block copolymer (polymer 4) having a hydrophobic chain segment and a hydrophilic sulfonated chain segment. FIG. 5 provides a specific example of the synthetic scheme of FIG. 4.

Figure 6:
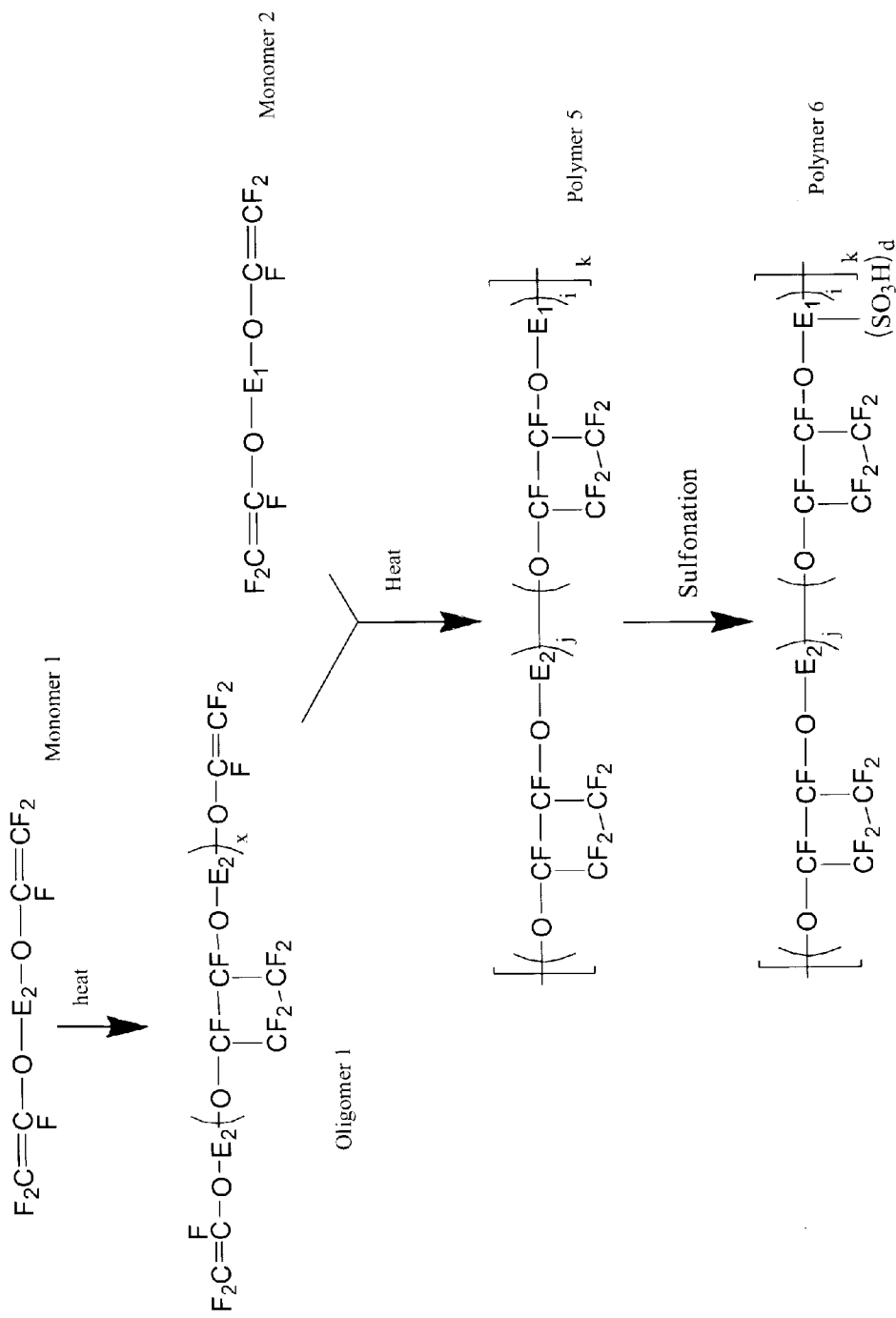
FIG. 6 shows yet another embodiment of a synthetic route of preparing a sulfonated perfluorocyclobutane block copolymer with linear polymer chain configuration.
Figure 7:
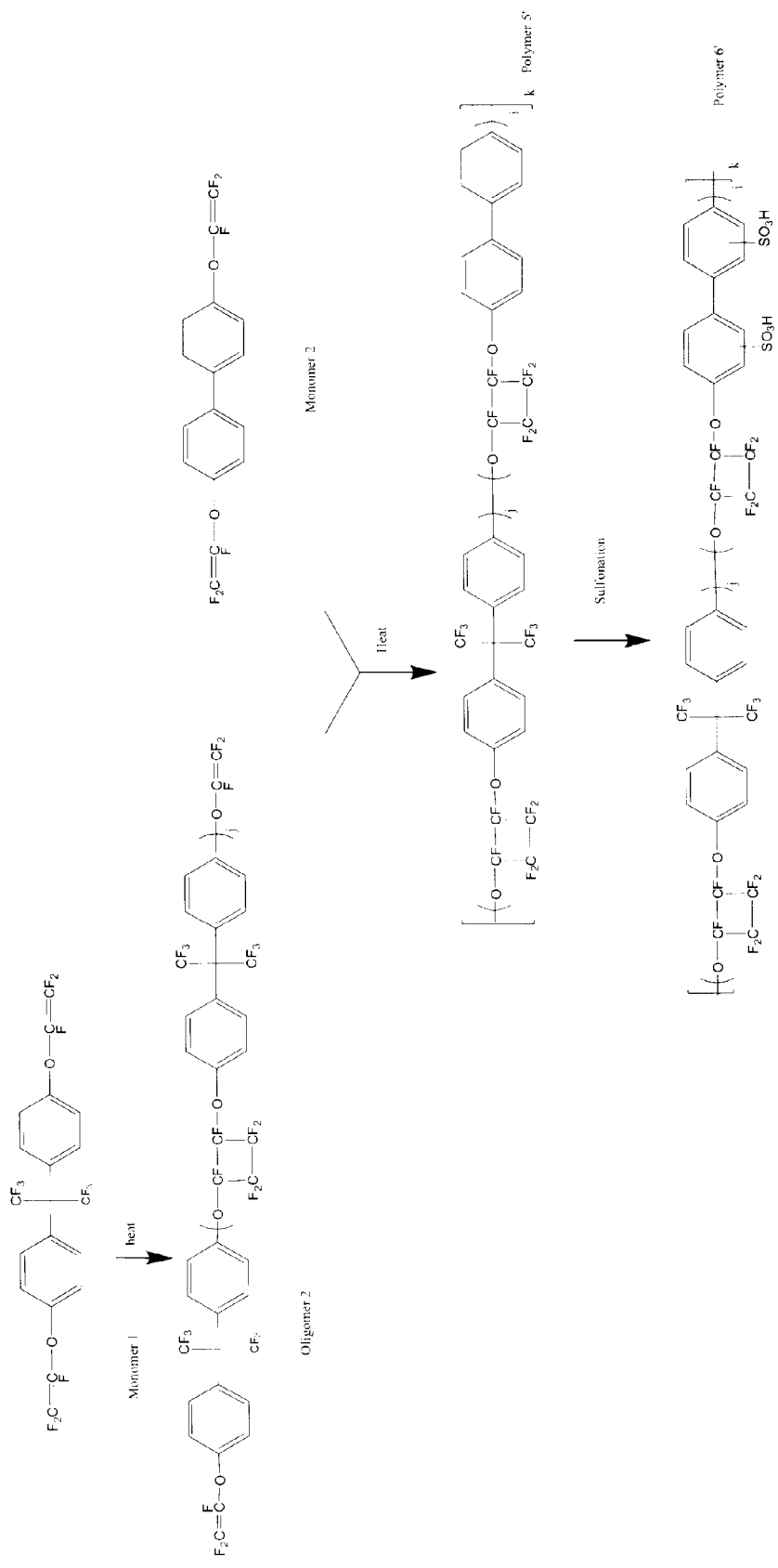
FIG. 7 shows a specific example of the synthetic route of FIG. 6.

In yet another embodiment, as shown in FIG. 6, oligomer 1 is formed from monomer 1 as set forth above. Monomer 2 is then reacted with oligomer 1 to form polymer 5. Polymer 5 is further reacted with a sulfonation agent XSO$_3$H (X is chlorine or fluorine atom) to selectively sulfonate moiety E$_1$, resulting in a perfluorocyclobutane block copolymer (polymer 6) having a hydrophobic chain segment and a hydrophilic sulfonated chain segment. FIG. 7 provides a specific example of the synthetic scheme of FIG. 6.

The following examples illustrate the various embodiments of the present invention. Those skilled in the art will recognize many variations that are within the spirit of the present invention and scope of the claims.

A block copolymer of 6F-oligomer 1' and BPVE oligomer 2' (see FIG. 3) is prepared as follows. Mesitylene solutions of 6F-oligomer (Mn~17,000, 40 grams in 40 g mesitylene) and BPVE-oligomer (1Mn=14,000, 80 grams in 160 grams mesitylene) are degassed individually with Ar for about 1 hr at 60° C. The BPVE-oligomer solution is then added gradually (40 grams every hour over a total 5 hour period) to the flask containing 6F-oligomer solution with stirring at 160° C. under Ar. After complete addition of the BPVE-oligomer, the reaction mixture is stirred (12 rpm) at 160° C. for an additional 16 hours. The temperature is then raised to 180° C. and mesitylene is removed by distillation to leave a sticky solid. The residual solids were then heated as follows: 200° C. for 2 hrs, 210° C. for 2 hrs while continually stirring at 12 rpm, and finally 220° C. for 16 hrs. (During the final 16 hrs, a timer is used to alternately switch the stirrer ON for 1 hr and OFF for 1 hr.) All the reactions are carried out in a 3-neck flask with mechanical stirring (stainless steel stirrer rod and a Teflon blade) and condenser. At the end of the reaction, the rigid polymer is cooled to 60° C. and completely dissolved in tetrahydrofuran (THF, 480 g, 25 wt % solids) at 60° C. with increased stirring speed. The polymer solution in THF is filtered through a 70-μm Teflon filter cloth and precipitated by slowly pouring into methanol (4 liters, L) while agitating with a glass rod. The cloudy methanol is decanted away and replaced with fresh methanol (2 L). This mixture is stirred and allowed to stand for 1 hr to remove any residual THF and low molecular weight oligomers trapped in the precipitated polymer. The methanol is decanted away and the polymer dried under vacuum at 60° C. (Mn~31 K, 108.5 g, 92% yield).

Preparation of Sulfonated Block Copolymer. Five grams of poly(biphenyl-perfluorovinyl ether)-(14,000 Mn)-co-poly(bisphenol-A-hexafluoroperfluorovinyl ether)-(17,000 Mn), obtained from Tetramer Technology (Pendleton, S.C, and prepared as described above), is dissolved in methylene chloride (Aldrich, catalog number 61005-0040, 100 mL) and is centrifuged for 15 minutes. The clear supernatant solution is decanted off from the sediment, which is a white insoluble gel. The resultant solution (132 g) is magnetically stirred in a 250-mL, glass, screw cap jar with a Teflon face lined lid (Fisher Scientific, catalog number 02-911-467) on a programmable hot plate set at 40° C. with a stirring rate of 400 cycles per minute. Chlorosulfonic acid (5.98 g, Aldrich, catalog number 32,025-0) is added and the reaction mixture turned brownish-purple. After 30 minutes, a purple polymer precipitated out of the reaction mixture and the solution is brown. After one hour, the brown reaction solvent is poured off from the purple precipitate, which is then washed twice with methylene chloride (50 mL for each wash). The purple precipitate is washed with water using a Waring blender until a white polymer is obtained. The polymer is collected by filtration, boiled in 2 liters of water for 1 hour in a 4-liter beaker with magnetic stirring, collected by filtration and air-dried to obtain 5 grams of sulfonated block copolymer with an ion exchange capacity of 1.82 meq. SO$_3$H per gram, as determined by titration with 0.0108 M sodium hydroxide. The polymer (3.5 g) dissolved in N,N-dimethylacetamide (15 g) is pressure filtered through a 0.5-micron Teflon Millipore filter and the yellow solution is coated on window-pane glass using an Erichsen coater set at 80° C. with an 4-mil Bird bar applicator. After oven-drying at 120° C. for two hours, the membrane is peeled from the glass using an atomized water sprayer to assist in release. The water uptake at room temperature is 31.6 wt. % and the volume swell is 27.7 vol. %. After boiling in water for 1-hour, the water uptake is 203.5 wt. % and the volume swell is 166 vol. %.

A sulfonated perfluorocyclobutane block polymer (as represented by polymer 2' in FIG. 2) is thus obtained in this manner and has the following properties.

| Weight Ratio BPVE Oligomer Mn~8,000 (x~45) | Weight Ratio 6F monomer | Max IEC (Assuming 2 mol SO3H/BPVE |
|---|---|---|
| 1.0 | 1 | 2.01 |
| 1.5 | 1 | 2.39 |
| 2.0 | 1 | 2.65 |
| 2.4 | 1 | 2.81 |

A crosslinked block copolymer may be obtained by mixing a small amount of 1,1,1-tris(4-trifluorovinyloxyphenyl)ethane (available from Oakwood Products, West Columbia, S.C.) prior to combining of oligomers 1' and 2', casting such mixture into a thin membrane and allowing the mixture to react and cure under nitrogen blanket at a temperature between about 160° C. to 350° C. The crosslinked membrane polymer may be sulfonated by reacting with chlorosulfonic acid to form a crosslinked block copolymer. The membrane material obtained is a good proton conductor suitable as cell membrane for fuel cells.

Unlike random copolymers, the sulfonated perfluorocyclobutane block copolymer according to this invention can self-assemble into certain morphologies where the hydrophobic chain segment aggregates to form a hydrophobic domain, and the hydrophilic sulfonated chain segment aggregates to form a hydrophilic domain. Since each block copolymer has at least one hydrophobic chain segment and at least one hydrophilic chain segment, the hydrophobic domains and the hydrophilic domains formed by the block copolymer are linked together through the polymer chains. In other words, the hydrophobic domains and hydrophilic domains are linked together through strong covalent bonds. Such morphology feature of the block copolymer can greatly restrict the water swelling of the hydrophilic domain in a high humidity environment. In a similar manner, the morphology also restricts shrinkage and collapse of the hydrophilic domain in a relatively dry environment. This morphological feature makes the sulfonated perfluorocyclobutane block copolymer an improved material for proton conductive membranes and binders in membrane electrode assemblies in fuel cells. The sulfonated perfluorocyclobutane block copolymer can improve the fuel cell performance especially under low humidity and high operating temperatures.

The physical morphology formed from the block copolymer, for example, may range from lamellar, bi-continuous, rod, sphere, and fibrous shapes, depending on processing conditions and specific structures of the polymer chain. In one embodiment, the hydrophilic domain formed from sulfonated perfluorocyclobutane ether chain segment forms a continuous phase across the membrane. Such morphology allows high ionic conductivity across the membrane. The hydrophobic domain of the perfluorocyclobutane block copolymer may assemble into a continuous or discontinuous phase. In general, long linear chain segments formed from difunctional monomers, such as monomer 1 and monomer 2 described above, provide good flexibility to the polymer chain to allow formation of desired morphology. For example, the diblock polymer, poly(biphenyl-perfluorovinyl ether)-(14,000 Mn)-co-poly(bisphenol-A-hexafluoroperfluorvinyl ether)-(17,000 Mn), prepared as shown in FIG. 3, shows extended lamellar morphology when stained with lead(II) acetate with domains less than 100 nm when analyzed with transmission electron microscopy. However, when multiblock polymers are evaluated using the same TEM technique, there are no apparent phase differences indicative of long range ordering of polymeric domains, and the materials appear to be homogeneous. In spite of the lack of long range order in the multiblock polymers, the fuel cell membranes made with the multiblock polymers are markedly improved over those of the random polymer membranes. Trifunctional monomers may improve stability of such morphology by providing chain rigidity through crosslinking of polymer chains. Additional trifunctional monomers, such as monomer 3 described above, however, should be limited to a small amount as they may introduce too much rigidity to the polymer chain through excessive branching and crosslinking. Too much rigidity may prevent the hydrophobic and hydrophilic chain segments to assemble into separate domains.

In one embodiment, the feature of linear chain segments of the block copolymer allows the sulfonated block copolymers to be easily processed into membranes, coatings, solutions, paste, dispersions, pellets, powder, and the like. The sulfonated block copolymer is soluble in some of the common organic solvents including, but not limited to, polar aprotic solvents such as DMAc, DMSO, NMP, DMF, mixtures of THF and alcohols, and cyclohexanone, which undergoes an acid-catalyzed condensation reaction. A resin solution or dispersion can be easily made by dissolving or dispersing the block copolymer into a suitable solvent. A proton conductive membrane can be formed by casting the resin solution or dispersion into a thin film or coating followed by evaporation of the solvent. The resin solution may also be used as a binder resin in place of NAFION® resin or in combination with NAFION® resin in preparing a membrane electrode assembly. Membrane electrode assemblies may be made using resin solutions or dispersions according to the disclosure in U.S. Pat. No. 5,316,871 and U.S. Pat. No. 6,521,381. Alternatively, the sulfonated block copolymer may be processed into membranes by thermal forming, calendaring, injection molding, blow molding, extrusion coating, thermal spray, and other thermoplastic processing methods known to an ordinary skill in the art.

The perfluorocyclobutane block copolymer can be blended with other homopolymers and copolymers to form a proton conductive membrane or a binder resin for a membrane electrode assembly. The sulfonated perfluorocyclobutane block copolymer may be used as a compatibilizer and stabilizer to allow uniform blend of hydrophobic and hydrophilic components in a formulation for proton conductive membranes and membrane electrode assemblies.

The following Table 1 and Examples I-VIII are provided to illustrate select embodiments of the invention. In Table 1 and Examples I-VIII 6F is an abbreviation for perfluoroisopropylidene bis(trifluorovinylether), and BPVE is an abbreviation for biphenyl bis (trifluorovinyl ether).

TABLE 1

BPVE/6F copolymer analysis

| Experiment (In DPE Solvent) | Mn | Product Composition BPVE/6F ($^{19}$F NMR) by weight |
|---|---|---|
| Example I | 38,000 | 2.3/1 |
| Example II | 67,000 | 1.9/1 |
| Example III | 50,000 | 2.0/1 |
| Example IV | 55,000 | 2.4/1 |
| Example V | 85,000 | 1.5/1 |
| Example VI | 35,000 | 1.0/1 |

The sulfonated block copolymers become increasingly more difficult to dissolve when the starting polymer molecular weight exceeds 55,000 number average molecular weight (Mn). When the molecular weight exceeds 55,000 (Mn), the high shear of a blender or homogenizer is required to break up gels so that a homogenous polymer solution can be formed.

EXAMPLE I

Mesitylene solutions of 6F (monomer, 40 g in 40 g mesitylene) and BPVE-oligomer (Mn=8,000, 80 g in 80 g mesitylene) are mixed together and degassed with Ar for about 1 hr at 60° C. The reaction mixture is then stirred (12 rpm) at 160° C. for 16 hours. The temperature is then raised to 180° C. and mesitylene is removed by distillation to leave a sticky solid. The residual solids are then heated as follows: 200° C. for 2 hours, 210° C. for 2 hours while continually stirring at 12 rpm, and finally 220° C. for 40 hours. (During this 40 hours, a timer is used to alternately switch the stirrer ON for 1 hour and OFF for 1 hour). All the reactions are carried out in a 1 L stainless steel reactor with mechanical stirring (stainless steel stirrer rod and stainless steel blades) and condenser. At the end of the reaction, the rigid polymer is cooled to 60° C. and completely dissolved in THF (480 g, 25 wt % solids) at 60° C. with increased stirring speed. The polymer solution in THF is filtered through a Teflon mesh filter cloth and precipitated by slowly pouring into methanol (4 L) while agitating with a glass rod. The cloudy methanol is decanted away and replaced with fresh methanol (2 L) and stirred for 1 hour. The methanol is decanted away and the polymer dried under vacuum at 60° C. (105 g, 88% yield).

A batch of the polymer could not be fractionated as follows: The polymer is dissolved in methylene chloride and centrifuged for 30 minutes at 3400 rpm. The material did not separate into two layers and no fractionation is observed. Table I lists some of the properties of the resultant product of Example I.

TABLE I

| Dist Name | Mn | Mw | MP | Mz | Mz + 1 | Mv | Polydispersity | % Area | Area | % Area |
|---|---|---|---|---|---|---|---|---|---|---|
| 1 | 37766 | 71673 | 80878 | 121343 | 188674 | | 1.897806 | 100.00 | 65511149 | 100.00 |
| 2 | | | | | | | | | | |

EXAMPLE II

Diphenyl ether (DPE) solutions of 6F (monomer, 5 g in 5 g DPE) and BPVE-oligomer (Mn=8,000, 10 g in 10 g DPE) are mixed together and degassed with Ar for about 1 hour@75° C. The reaction mixture is then stirred (12 rpm) at 160° C. for 1 hour. The reaction mixture is then heated as follows: 180° C. for 1 hour, 200° C. for 16 hours, 220° C. for 3 hours, 230° C. for 2 hours while continually stirring at 12 rpm and finally 235° C. for 85 hours. At 235° C., samples are withdrawn from the reaction mixture after 22 hours, 30 hours and 85 hours for gel permeation chromatography (GPC) molecular weight analysis. Towards the end of the reaction, the reaction solution inside the flask has a viscous gel-like appearance. All the reactions are carried out in a 3 neck flask with mechanical stirring (stainless steel stirrer rod and a Teflon blade) and condenser. At the end of the reaction, the viscous solution is cooled to 60° C. and diluted in THF (40 g, 25 wt % solids) at 60° C. with increased stirring speed. The polymer solution in THF is filtered through an ETFE filter cloth and precipitated by slowly pouring into methanol (4 L) while agitating with a glass rod. The cloudy methanol is decanted away and replaced with fresh methanol (2 L) and stirred for 1 hour. The methanol is decanted away and the polymer dried under vacuum at 60° C. Trace amounts of DPE are suspected to be still present in the polymer. Soxhlet extraction is performed with methanol to remove traces of DPE from the copolymer (, 13.8 g, 92% yield).

A batch of the polymer could not be fractionated as follows: The polymer is dissolved in methylene chloride and centrifuged for 30 minutes at 3400 rpm. The material did not separate into two layers and no fractionation is observed. Table II lists some of the properties of the resultant product of Example II.

TABLE II

| Dist Name | Mn | Mw | MP | Mz | Mz + 1 | Mv | Polydispersity | % Area | Area | % Area |
|---|---|---|---|---|---|---|---|---|---|---|
| 1 | 66768 | 139599 | 110074 | 270122 | 473873 | | 2.090819 | 100.00 | 187785336 | 100.00 |
| 2 | | | | | | | | | | |

EXAMPLE III

Diphenyl ether (DPE) solutions of 6F (monomer, 30 g in 30 g DPE) and BPVE-oligomer (Mn=8,000, 60 g in 60 g DPE) are mixed together and degassed with Ar for about 1 hour at 75° C. The reaction mixture is then stirred (12 rpm) at 160° C. overnight. The reaction mixture is then heated as follows: 180° C. overnight, 200° C. for 3 hours, 220° C. for 6 hours, 230° C. overnight while continually stirring at 12 rpm and finally 240° C. for 4 hours. The reaction is carried out in a 1-L stainless steel reactor with mechanical stirring (stainless steel stirrer rod and a Teflon blade) and condenser. At the end of the reaction, the viscous solution is cooled to 60° C. and diluted in THF (270 g, 25 wt % solids) at 60° C. with increased stirring speed. The polymer solution in THF is filtered through a Teflon mesh filter cloth and precipitated by slowly pouring into methanol (4 L) while agitating with a glass rod. The cloudy methanol is decanted away and replaced with fresh methanol (2 L) and stirred for 1 hour. The methanol is decanted away and the polymer dried under vacuum at 60° C. Trace amounts of DPE are suspected to be still present in the polymer. Soxhlet extraction is performed with methanol to remove traces of DPE from the copolymer (84 g, 92% yield).

A batch of the polymer could not be fractionated as follows: The polymer is dissolved in methylene chloride and centrifuged for 30 minutes at 3400 rpm. The material did not separate into two layers and no fractionation is observed. Table III lists some of the properties of the resultant product of Example III.

TABLE III

| Dist Name | Mn | Mw | MP | Mz | Mz + 1 | Mv | Polydispersity | % Area | Area | % Area |
|---|---|---|---|---|---|---|---|---|---|---|
| 1 | 49609 | 93173 | 94849 | 154003 | 236945 | | 1.878141 | 100.00 | 151958340 | 100.00 |
| 2 | | | | | | | | | | |

EXAMPLE IV

Diphenyl ether (DPE) solutions of 6F (monomer, 16 g in 16 g DPE) and BPVE-oligomer (Mn=8,000, 38.4 g in 38.4 g DPE) are mixed together and degassed with Ar for about 1 hour at 75° C. The reaction mixture is then stirred (12 rpm) at 165° C. overnight. The reaction mixture is then heated as follows: 180° C. overnight, 200° C. for 3 hours, 220° C. for 6 hours, 230° C. overnight while continually stirring at 12 rpm, and finally 240° C. for 4 hours. The reaction is carried out in a 3-neck glass flask with mechanical stirring (stainless steel stirrer rod and a Teflon blade) and condenser. At the end of the reaction, the viscous solution is cooled to 60° C. and diluted in THF (165 g, 25 wt % solids) at 60° C. with increased stirring speed. The polymer solution in THF is filtered through an ETFE filter cloth and precipitated by slowly pouring into methanol (4 L) while agitating with a glass rod. The cloudy methanol is decanted away and replaced with fresh methanol (2 L) and stirred for 1 hour. The methanol is decanted away and the polymer dried under vacuum at 60° C. Trace amounts of DPE are suspected to be still present in the polymer. Soxhlet extraction is performed with methanol to remove traces of DPE from the copolymer (49.6 g, 91% yield).

A batch of the polymer could not be fractionated as follows: The polymer is dissolved in methylene chloride and centrifuged for 30 minutes at 3400 rpm. The material did not separate into two layers and no fractionation is observed. Table IV lists some of the properties of the resultant product of Example IV.

EXAMPLE V

Diphenyl ether (DPE) solutions of 6F (monomer, 46 g in 34 g DPE) and BPVE-oligomer (Mn=8,000, 70 g in 50 g DPE) are mixed together and degassed with Ar for about 1 hour at 75° C. The reaction mixture is then heated as follows: 140° C. overnight, 150° C. for 6 hours, 180° C. overnight, 200° C. for 3 hours, 230° C. overnight, 240° C. 4 hours while continually stirring at 12 rpm and finally 240° C. for 6 hours. The reaction is carried out in a 1-L stainless steel reactor with mechanical stirring (stainless steel stirrer rod and a Teflon blade) and condenser. A heating mantle is used for heating instead of an oil bath and the inside temperature is monitored. At the end of the reaction, the viscous solution is cooled to 60° C. and diluted in THF (480 g, 20 wt % solids) at 60° C. with increased stirring speed. The polymer solution in THF is filtered through a Teflon mesh filter cloth and precipitated by slowly pouring into methanol (4 L) while agitating with a magnetic stirrer. The cloudy methanol is decanted away and replaced with fresh methanol (2 L). This mixture is stirred and allowed to stand for 1 hour to remove any residual THF, DPE and low molecular weight oligomers trapped in the precipitated polymer. The methanol is decanted away and the polymer is dried under vacuum at 60° C. Trace amounts of DPE are suspected to be still present in the polymer. Soxhlet extraction is performed with methanol to remove traces of DPE from the copolymer (110 g, 88% yield).

A batch of the polymer could not be fractionated as follows: The polymer is dissolved in methylene chloride and centrifuged for 30 minutes at 3400 rpm. The material did not separate into two layers and no fractionation is observed. Table V lists some of the properties of the resultant product of Example V.

TABLE IV

| Dist Name | Mn | Mw | MP | Mz | Mz + 1 | Mv | Polydispersity | % Area | Area | % Area |
|---|---|---|---|---|---|---|---|---|---|---|
| 1 | 49320 | 93339 | 89855 | 162086 | 259252 | | 1.892504 | 100.00 | 87084621 | 100.00 |
| 2 | | | | | | | | | | |

TABLE V

| Dist Name | Mn | Mw | MP | Mz | Mz + 1 | Mv | Polydispersity | % Area | Area | % Area |
|---|---|---|---|---|---|---|---|---|---|---|
| 1 | 84575 | 176112 | 132612 | 337310 | 562329 |  | 2.082305 | 100.00 | 107885720 | 100.00 |
| 2 |  |  |  |  |  |  |  |  |  |  |

EXAMPLE VI

Diphenyl ether (DPE) solutions of 6F (monomer, 25 g in 17 g DPE) and BPVE-oligomer (Mn=8,000, 25 g in 17 g DPE) are mixed together and degassed with Ar for about 1 hour at 75° C. The reaction mixture is then heated as follows: 140° C. overnight, 150° C. for 6 hours, 180° C. overnight, 200° C. for 3 hours, 230° C. overnight, 240° C. for 4 hours while continually stirring at 12 rpm, and finally 240° C. for 6 hours. The reaction is carried out in a 1-L stainless steel reactor with mechanical stirring (stainless steel stirrer rod and a Teflon blade) and condenser. A heating mantle is used for heating instead of an oil bath and the inside temperature is monitored. At the end of the reaction, the viscous solution is cooled to 60° C. and diluted in THF (200 g, 20 wt % solids) at 60° C. with increased stirring speed. The polymer solution in THF is filtered through a Teflon mesh filter cloth and precipitated by slowly pouring into methanol (4 L) while agitating with a magnetic stirrer. The cloudy methanol is decanted away and replaced with fresh methanol (2 L) and stirred 1 hour. The methanol is decanted away and the polymer dried under vacuum at 60° C. Trace amounts of DPE are suspected to be still present in the polymer. Soxhlet extraction is performed with methanol to remove traces of DPE from the copolymer (43.2 g, 86% yield).

Figure 8:
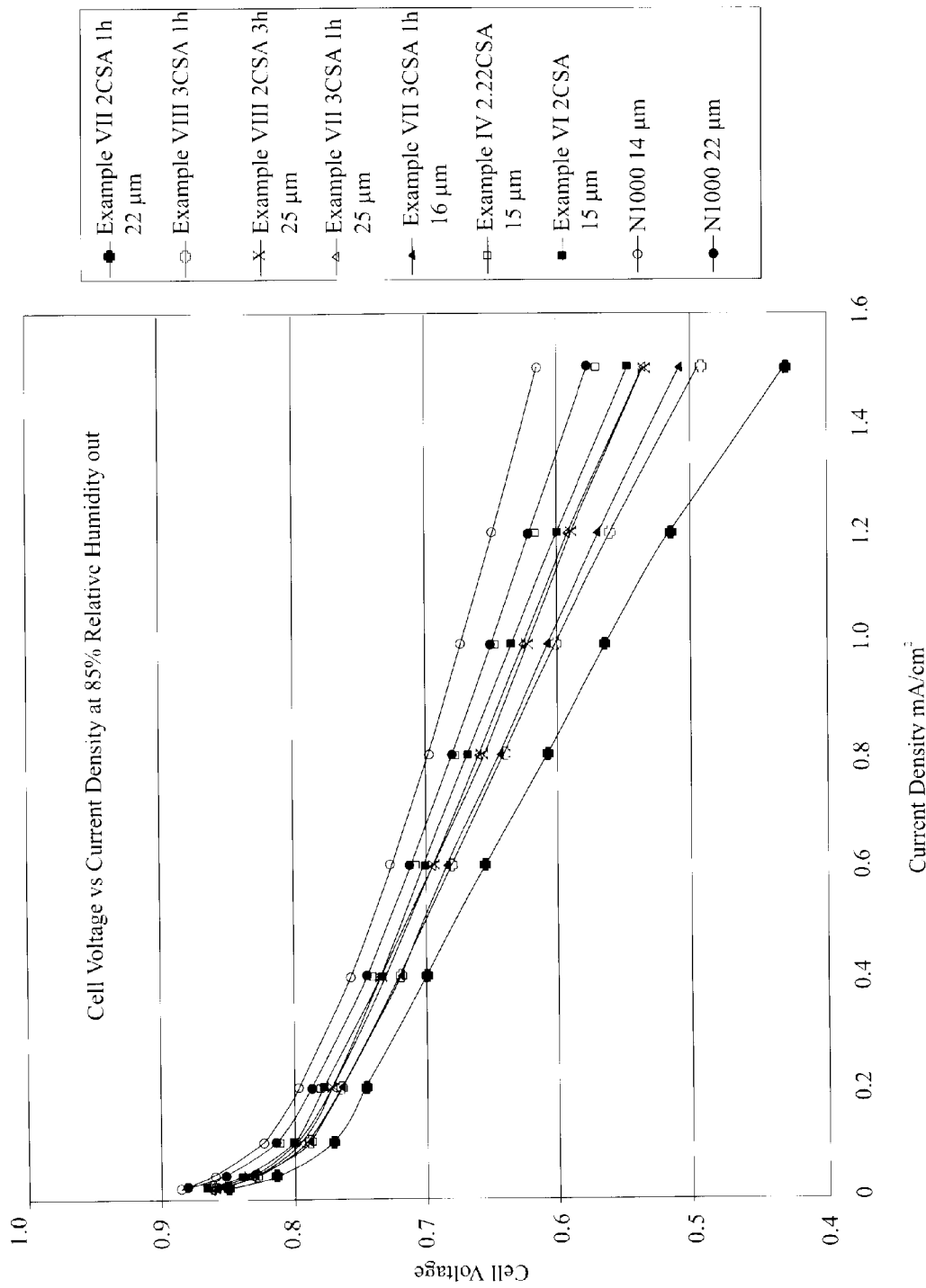
FIG. 8 provides fuel cell results utilizing polymers of an embodiment of the invention.

A batch of the polymer could not be fractionated as follows: The polymer is dissolved in methylene chloride and centrifuged for 30 minutes at 3400 rpm. The material did not separate into two layers and no fractionation is observed. Table VI lists some of the properties of the resultant product of Example VI.

stirring using a Teflon coated stirring rod. The methylene chloride is decanted off and the polymeric residue is chopped in a Waring blender with a minimal amount of water (ca 50 mL) until the polymer turns white. The polymer is washed with 1 liter of water, filtered and then suspended in water (2500-mL) in a 4-L beaker with magnetic stirring. After boiling for 1 hour, the polymer is isolated by filtration, washed with water and then air-dried to yield 23 grams of sulfonated polymer. The polymer (1 gram) is dissolved in N,N-dimethylacetamide (8 grams) using a roll mill, and the resultant solution is pressure-filtered through a 5-μm MilliporeTeflon filter, centrifuged to remove air bubbles and then coated on window-pane glass with a Bird applicator with an 8-mil gap. After drying at 80° C., the film is floated off the glass by immersion in water and then air-dried. The film has an ion exchange capacity of 2.0 milliequivalents per gram as determined by titration with 0.0108 M sodium hydroxide solution. The film is evaluated as an ion exchange membrane in a hydrogen-air fuel cell using 0.4mg/cm$^2$-platinum on carbon (Tanaka) catalyst electrodes coated on carbon fiber diffusion media with a sintered-Teflon particle, microporous layer. Fuel cell results are summarized in FIG. 8 and compared with results obtained with Nafion 1000 membranes at 14 and 22 μm at 85% relative humidity out of the cell. Fuel cell operating conditions are as follows (anode/cathode): 2/2 H$_2$/air stoichiometries, 50%/50% RHinlets, 80° C., 75 kPa.

| Dist Name | Mn | Mw | MP | Mz | Mz + 1 | Mv | Polydispersity | % Area | Area | % Area |
|---|---|---|---|---|---|---|---|---|---|---|
| 1 | 35293 | 62932 | 77771 | 98044 | 139695 |  | 1.783161 | 99.91 | 37035248 | 99.91 |
| 2 |  |  | 125 |  |  |  |  | 0.09 | 32676 | 0.09 |

General Sulfonation Procedures

EXAMPLE VII

Sulfonation of Polymers with Chlorosulfonic Acid

A 1-liter resin kettle equipped with an argon inlet, condenser, mechanical stirrer, thermometer, and addition funnel is situated in a silicone oil heating bath. The block polymer (20 grams) in methylene chloride (400 mL) is stirred for 16 hours at 23° C., and then is heated at 36° C. Chlorosulfonic acid (50 grams for a 2.5 weight ratio of chlorosulfonic acid to the weight of polymer) is rapidly added. A purple polymer precipitate forms that separates from the reaction mixture usually after 30 minutes. One hour after the addition of the chlorosulfonic acid, the brown reaction solvent is decanted off from the purple polymer precipitate and the polymeric residue is washed with methylene chloride (100 mL) with Sulfonation with Oleum

EXAMPLE VIII

Figure 9:
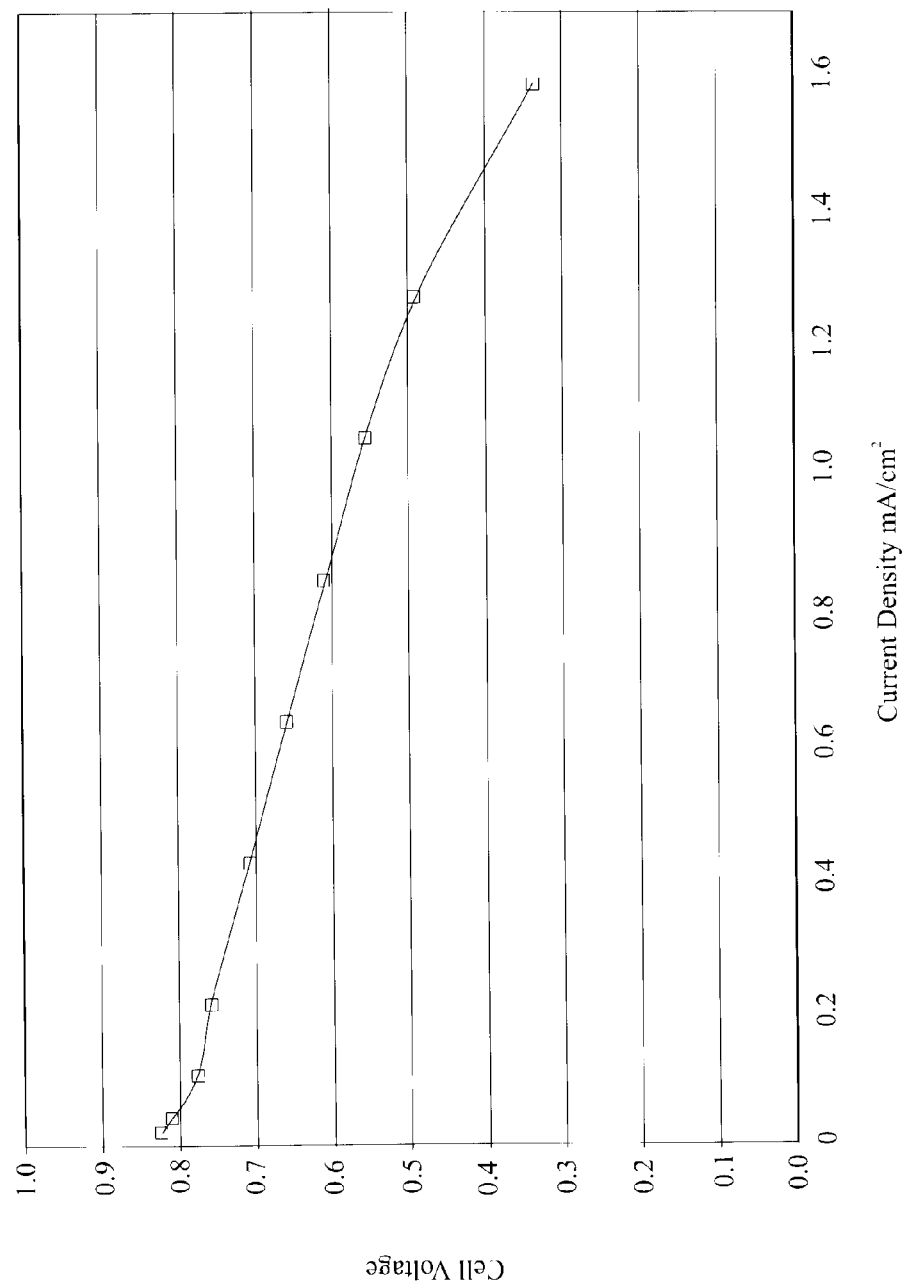
FIG. 9 provides fuel cell results utilizing polymers of an embodiment of the invention.

One gram of poly(biphenyl-perfluorovinyl ether)-(14,000 Mn)-co-poly(bisphenol-A-hexafluoroperfluorovinyl ether)-(17,000 Mn), obtained from Tetramer Technology (Pendleton, S.C., and prepared as described above), that has been dissolved in methylene chloride (Aldrich, catalog number 61005-0040, 10 mL) is centrifuged for 15 minutes. The clear supernatant solution is decanted off from the sediment, which is a white insoluble gel. The resultant solution (9.7 g) is magnetically stirred in a 30-mL, glass, screw cap jar with a Teflon face lined lid. Oleum (30 wt. %, Aldrich, 1.4 g) is added and the reaction mixture immediately turned purple and a polymeric residue formed. After 30 minutes, the methylene chloride solvent is decanted off from the purple polymer that has precipitated out of the reaction mixture. The purple precipitate is washed with water using a Waring blender until a white polymer is obtained. The polymer is collected by filtration and air-dried. The polymer (0.8 g) in N,N-dimethylacetamide (6 g) is pressure filtered through a 0.5-micron Teflon Millipore filter and the yellow solution is coated on window-pane glass using an Erichsen coater set at 80° C. with an 8-mil Bird bar applicator. The film is successfully evaluated in a hydrogen-air fuel cell membrane using 0.4mg/cm²-platinum on carbon (Tanaka) catalyst electrodes coated on carbon fiber diffusion media with a sintered-Teflon particle, microporous layer. Results are shown in FIG. 9. Fuel cell operating conditions are as follows (anode/cathode): 2/2 $H_2$/air stoichiometries, 50%/50% RHinlets, 80° C., 75 kPa.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A polymer comprising polymer polymer segment 1 and polymer segment 2:

$[E_1(Z_1)_d]$—$P_1$-$Q_1$-$P_2$     1

$E_2$-$P_3$-$Q_2$-$P_4$     2 wherein:
   $Z_1$ is —$SO_2X$, —$PO_3H_2$, or —COX;
   $E_1$ is an aromatic containing moiety;
   $E_2$ is an unsulfonated aromatic-containing and/or aliphatic-containing moiety;
   X is an —OH, a halogen, an ester, or

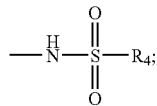

d is the number of $Z_1$ attached to $E_1$;
   $P_1$, $P_2$, $P_3$, $P_4$ are each independently: absent, —O—, —S—, —SO—, —CO—, —$SO_2$—, —$NR_1H$—, $NR_2$—, or —$R_3$—, and
   $R_2$ is $C_{1-25}$ alkyl, $C_{1-25}$ aryl or $C_{1-25}$ arylene;
   $R_3$ is $C_{1-25}$ alkylene, $C_{1-25}$ perfluoroalkylene, perfluoroalkyl ether, alkylether, or $C_{1-25}$ arylene;
   $R_4$ is trifluoromethyl, $C_{1-25}$ alkyl, $C_{1-25}$ perfluoroalkylene, $C_{1-25}$ aryl, or another $E_1$ group; and
   $Q_1$, $Q_2$ are each independently a fluorinated cyclobutyl moiety.

2. The polymer of claim 1 wherein the polymer segment 1 is repeated i times to form polymer unit 3:

-($[E_1(Z_1)_d]$—$P_1$-$Q_1$-$P_2)_i$—     3; and polymer segment 2 is repeated j times for form polymer unit 4

-($E_2$-$P_2$-$Q_2$-$P_2)_j$—     4.

3. The polymer of claim 2 wherein i and j are each independently from 1 to 500.

4. The polymer of claim 2 wherein i and j are each independently from 1 to 200.

5. The polymer of claim 2 wherein i and j are each independently from 1 to 35.

6. The polymer of claim 2 wherein i and j are each independently from 5 to 60.

7. The polymer of claim 2 in yet another refinement of this variation, i and j are each independently from 5 to 35.

8. The polymer of claim 1 wherein $Q_1$ and $Q_2$ are each independently a perfluorocyclobutyl moiety.

9. The polymer of claim 1 wherein $Q_1$ and $Q_2$ are each independently:

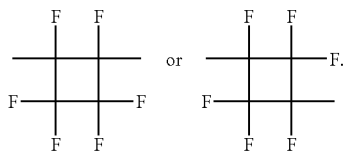

10. The polymer of claim 1 having a hydrophobic perfluorocyclobutane ether chain segment and a hydrophilic sulfonated perfluorocyclobutane ether chain segment.

11. The polymer of claim 1 wherein E1 and E2 are each independently selected from the group consisting of:

6

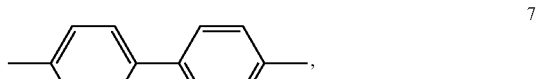

7

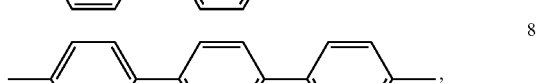

8

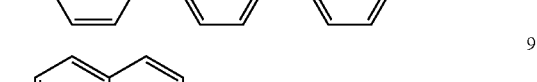

9

10

11

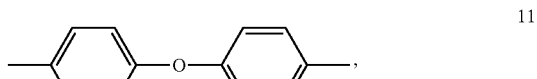

12

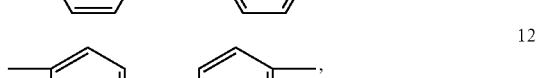

13

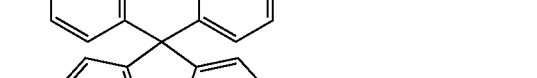

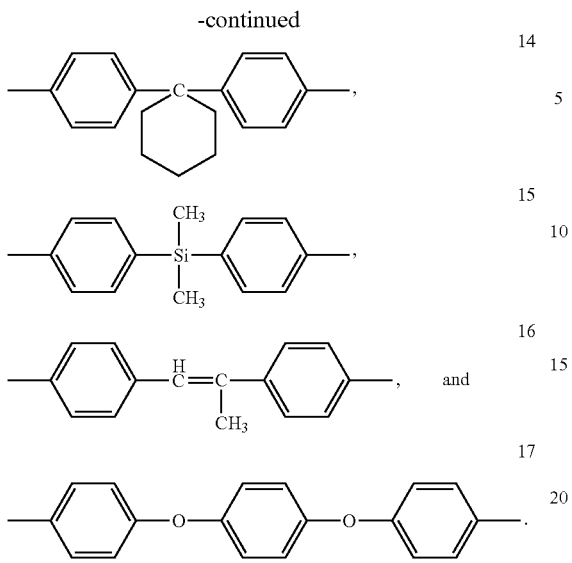

12. The polymer of claim 1 having the following formula:

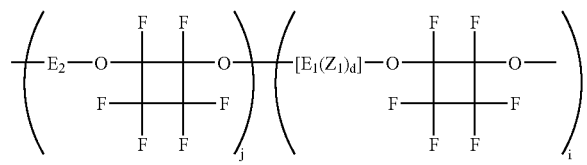

wherein, $E_2$ is a hydrophobic aromatic ring containing moiety free of an ionic group and $E_2$ is a moiety having at least one aromatic ring.

13. The polymer of claim 1, wherein said $E_2$ is selected from the group consisting of:

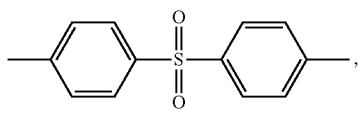

14. The polymer of claim 1, wherein said $E_2$ is 2,2'-diphenyl hexafluoropropane moiety and $E_1$ is a diphenyl moiety.

15. The polymer of claim 1 wherein the total number of segments having formula 1 in a polymer sample is equal to or greater than half the total number of segments having formula 2 in that polymer sample.

16. The polymer of claim 1 wherein the total number of segments having formula 1 in a polymer sample is equal to or greater than the total number of segments having formula 2.

17. The polymer of claim 1 wherein the total number of segments having formula 1 plus the total number of segments having formula 2 is less than 500 with the total number of segments having formula 1 being greater than the total number of segments having formula 2.

18. A polymer membrane electrode comprising the polymer of claim 1.

19. A polymer having the following formula:

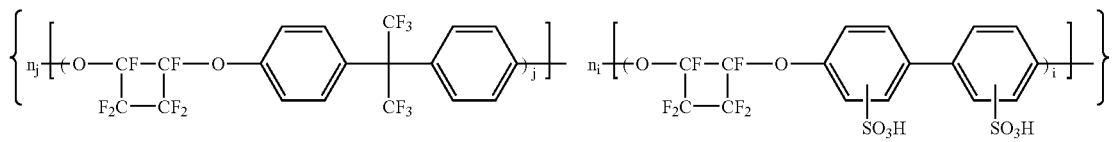

wherein:
$n_1$, $n_2$ are block counting number.

20. The polymer of claim 19 wherein $n_1$, $n_2$ define a block copolymer, a random copolymer, or a multiblock copolymer.

* * * * *